United States Patent
Basu et al.

(10) Patent No.: US 6,219,640 B1
(45) Date of Patent: Apr. 17, 2001

(54) METHODS AND APPARATUS FOR AUDIO-VISUAL SPEAKER RECOGNITION AND UTTERANCE VERIFICATION

(75) Inventors: Sankar Basu, Tenafly, NJ (US); Homayoon S. M. Beigi, Yorktown Heights, NY (US); Stephane Herman Maes, Danbury, CT (US); Benoit Emmanuel Ghislain Maison, White Plains, NY (US); Chalapathy Venkata Neti, Yorktown Heights, NY (US); Andrew William Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/369,706

(22) Filed: Aug. 6, 1999

(51) Int. Cl.[7] .................................................. G10L 15/00

(52) U.S. Cl. ........................ 704/246; 704/231; 704/273

(58) Field of Search .................................. 382/115, 118; 379/88.02; 704/273, 246, 231, 251, 275

(56) References Cited

U.S. PATENT DOCUMENTS

| | | | |
|---|---|---|---|
| 4,449,189 | * | 5/1984 | Feix et al. ............................. 704/272 |
| 4,757,451 | | 7/1988 | Beadles . |
| 4,845,636 | * | 7/1989 | Walker ............................ 364/479.07 |
| 5,412,738 | * | 5/1995 | Brunelli et al. ....................... 382/115 |
| 5,602,933 | * | 2/1997 | Blackwell et al. ................... 382/116 |
| 5,625,704 | * | 4/1997 | Prasad ................................. 382/118 |
| 5,897,616 | * | 4/1999 | Kanevsky et al. ................... 704/246 |

OTHER PUBLICATIONS

C. Neti et al., "Audio–Visual Speaker Recognition For Video Broadcast News", Proceedings of the ARPA HUB4 Workshop, Washington, D.C., pp. 1–3, Mar. 1999.

A.W. Senior, "Face and Feature Finding For a Face Recognition System," Second International Conference on Audio–and Video–based Biometric Person Authentication, Washington, D.C., pp. 1–6, Mar. 1999.

P. De Cuetos et al., "Frontal Pose Detection for Human–Computer Interaction," pp. 1–12, Jun. 23, 1999.

R. Stiefelhagen et al., "Real–Time Lip–Tracking for Lip-reading," Interactive Systems Labortories, University of Karlsruhe, Germany and Carnegie Mellon University, U.S.A., pp. 1–4, Apr. 27, 1998.

P.N. Belhumeur et al., "Eigenfaces vs. Fisherfaces: Recognition Using Class Specfic Linear Projection," IEEE Trans. on PAMI, pp. 1–34, Jul. 1997.

(List continued on next page.)

Primary Examiner—David Hudspeth
Assistant Examiner—Daniel Abebe
(74) Attorney, Agent, or Firm—Paul J. Otterstedt; Ryan, Mason & Lewis, LLP (57) ABSTRACT

Methods and apparatus for performing speaker recognition comprise processing a video signal associated with an arbitrary content video source and processing an audio signal associated with the video signal. Then, an identification and/or verification decision is made based on the processed audio signal and the processed video signal. Various decision making embodiments may be employed including, but not limited to, a score combination approach, a feature combination approach, and a re-scoring approach. In another aspect of the invention, a method of verifying a speech utterance comprises processing a video signal associated with a video source and processing an audio signal associated with the video signal. Then, the processed audio signal is compared with the processed video signal to determine a level of correlation between the signals. This is referred to as unsupervised utterance verification. In a supervised utterance verification embodiment, the processed video signal is compared with a script representing an audio signal associated with the video signal to determine a level of correlation between the signals.

61 Claims, 6 Drawing Sheets-

OTHER PUBLICATIONS

N.R. Garner et al., "Robust Noise Detection for Speech Detection and Enhancement," IEE, pp. 1–2, Nov. 5, 1996.

H. Ney, "On the Probabilistic Interpretation of Neural Network Classifiers and Discriminative Training Criteria," IEEE Transactions on Pattern Analysis and Machine Intelligence, vol. 17, No. 2, pp. 107–112, Feb. 1995.

L. Wiskott et al., "Recognizing Faces by Dynamic Link Matching," ICANN '95, Paris, Francis, pp. 347–342, 1995.

A.H. Gee et al., "Determining the Gaze of Faces in Images," Univeristy of Cambridge, Cambridge, England, pp. 1–20, Mar. 1994.

C. Bregler et al., "Eigenlips For Robust Speech Recognition," IEEE, pp. II–669–II–672.

C. Benoîl et al., "Which Components of the Face Do Humans and Machines Best Speechread?," Institut de la Communication Parlèe, Grenoble, France, pp. 315–328.

Q. Summerfield, "Use of Visual Information for Phonetic Perception," Visual Information for Phonetic Perception, MRC Institute of Hearing Research, Univeristy Medical School, Nottingham, pp. 314–330.

N. Krüger et al., "Determination of Face Position and Pose With a Learned Representation Based on Label Graphs," Ruhr–Universität Bochum, Bochum, Germany and University of Southern California, Los Angeles, CA, pp. 1–19.

G. Potamianos et al., "Discriminative Training of HMM Stream Exponents for Audio Visual Speech Recognition," AT&T Labs Research, Florham and Red Bank, NJ, pp. 1–4.

* cited by examiner

| | ACOUSTIC CONDITION | CLEAN | NOISY | TELEPHONE |
|---|---|---|---|---|
| 1 | AUDIO ID ONLY | 92.9% | 77.9% | 50.7% |
| 2 | VIDEO ID ONLY | 63.6% | 63.6% | 63.6% |
| 3 | LINEAR FUSION - HARD OPT. | 90.9% | 81.2% | 67.5% |
| 4 | LINEAR FUSION - SOFT OPT. | 92.2% | 82.5% | 67.5% |
| 5 | MATCHED FUSION - HARD OPT. | 90.9% | 83.8% | 74.0% |
| 6 | MATCHED FUSION - SOFT OPT. | 92.2% | 84.4% | 74.0% |
| 7 | OUTLIER - $\alpha_1 = 0, \alpha_2 = \pi/2$ | 91.6% | 82.5% | 74.0% |
| 8 | OUTLIER - $\alpha_1 = 0, \alpha_2 = \pi/4$ | 93.5% | 84.4% | 74.7% |

TABLE 1: AUDIO-VISUAL SPEAKER ID

METHODS AND APPARATUS FOR AUDIO-VISUAL SPEAKER RECOGNITION AND UTTERANCE VERIFICATION

CROSS REFERENCE TO RELATED APPLICATIONS

The present application is related to the U.S. patent application entitled: "Methods And Apparatus for Audio-Visual Speech Detection and Recognition," filed concurrently herewith and incorporated by reference herein.

FIELD OF THE INVENTION

The present invention relates generally to speaker recognition and, more particularly, to methods and apparatus for using video and audio information to provide improved speaker recognition and utterance verification in connection with arbitrary content video.

BACKGROUND OF THE INVENTION

Humans identify speakers based on a variety of attributes of the person which include acoustic cues, visual appearance cues and behavioral characteristics (e.g., such as characteristic gestures, lip movements). In the past, machine implementations of person identification have focused on single techniques relating to audio cues alone (e.g., audio- based speaker recognition), visual cues alone (e.g., face identification, iris identification) or other biometrics. More recently, researchers are attempting to combine multiple modalities for person identification, see, e.g., J. Bigun, B. Duc, F. Smeraldi, S. Fischer and A. Makarov, "Multi-modal person authentication," In H. Wechsler, J. Phillips, V. Bruce, F. Fogelman Soulie, T. Huang (eds.) Face Recognition: From theory to applications, Berlin Springer- Verlag, 1999.

Speaker recognition is an important technology for a variety of applications including security and, more recently, as an index for search and retrieval of digitized multimedia content (for instance in the MPEG-7 standard). Audio-based speaker recognition accuracy under acoustically degraded conditions (e.g., such as background noise) and channel mismatch (e.g., telephone) still needs further improvements. To make improvements in such degraded conditions is a difficult problem. As a result, it would be highly advantageous to provide methods and apparatus for providing improved speaker recognition that successfully perform in the presence of acoustic degradation, channel mismatch, and other conditions which have hampered existing speaker recognition techniques.

SUMMARY OF THE INVENTION

The present invention provides various methods and apparatus for using visual information and audio information associated with arbitrary video content to provide improved speaker recognition accuracy. It is to be understood that speaker recognition may involve user enrollment, user identification (i.e., find who the person is among the enrolled users), and user verification (i.e., accept or reject an identity claim provided by the user). Further, the invention provides methods and apparatus for using such visual information and audio information to perform utterance verification.

In a first aspect of the invention, a method of performing speaker recognition comprises processing a video signal associated with an arbitrary content video source and processing an audio signal associated with the video signal. Then, an identification and/or verification decision is made based on the processed audio signal and the processed video signal. Various decision making embodiments may be employed including, but not limited to, a score combination approach, a feature combination approach, and a re-scoring approach.

As will be explained in detail, the combination of audio-based processing with visual processing for speaker recognition significantly improves the accuracy in acoustically degraded conditions such as, for example only, the broadcast news domain. The use of two independent sources of information brings significantly increased robustness to speaker recognition since signal degradations in the two channels are uncorrelated. Furthermore, the use of visual information allows a much faster speaker identification than possible with acoustic information alone. In accordance with the invention, we present results of various methods to fuse person identification based on visual information with identification based on audio information for TV broadcast news video data (e.g., CNN and CSPAN) provided by the Linguistic Data Consortium (LDC). That is, we provide various techniques to fuse video based speaker recognition with audio-based speaker recognition to improve the performance under mismatch conditions. In a preferred embodiment, we provide technique to optimally determine the relative weights of the independent decisions based on audio and video to achieve the best combination. Experiments on video broadcast news data suggest that significant improvements are achieved by such a combination in acoustically degraded conditions.

In a second aspect of the invention, a method of verifying a speech utterance comprises processing a video signal associated with a video source and processing an audio signal associated with the video signal. Then, the processed audio signal is compared with the processed video signal to determine a level of correlation between the signals. This is referred to as unsupervised utterance verification. In a supervised utterance verification embodiment, the processed video signal is compared with a script representing an audio signal associated with the video signal to determine a level of correlation between the signals.

Of course, it is to be appreciated that any one of the above embodiments or processes may be combined with one or more other embodiments or processes to provide even further speech recognition and speech detection improvements.

Also, it is to be appreciated that the video and audio signals may be of a compressed format such as, for example, the MPEG-2 standard. The signals may also come from either a live camera/microphone feed or a stored (archival) feed. Further, the video signal may include images of visible and/or non-visible (e.g., infrared or radio frequency) wavelengths. Accordingly, the methodologies of the invention may be performed with poor lighting, changing lighting, or no light conditions. Given the inventive teachings provided herein, one of ordinary skill in the art will contemplate various applications of the invention.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative speaker recognition implementation. The illustrative embodiments include both identification and/or verification methodologies. However, it is to be understood that the present invention is not limited to a particular application or structural embodiment. Rather, the invention is more generally applicable to any situation in which it is desirable to improve speaker recognition accuracy and provide utterance verification by employing visual information in conjunction with corresponding audio information during the recognition process.

Figure 1:
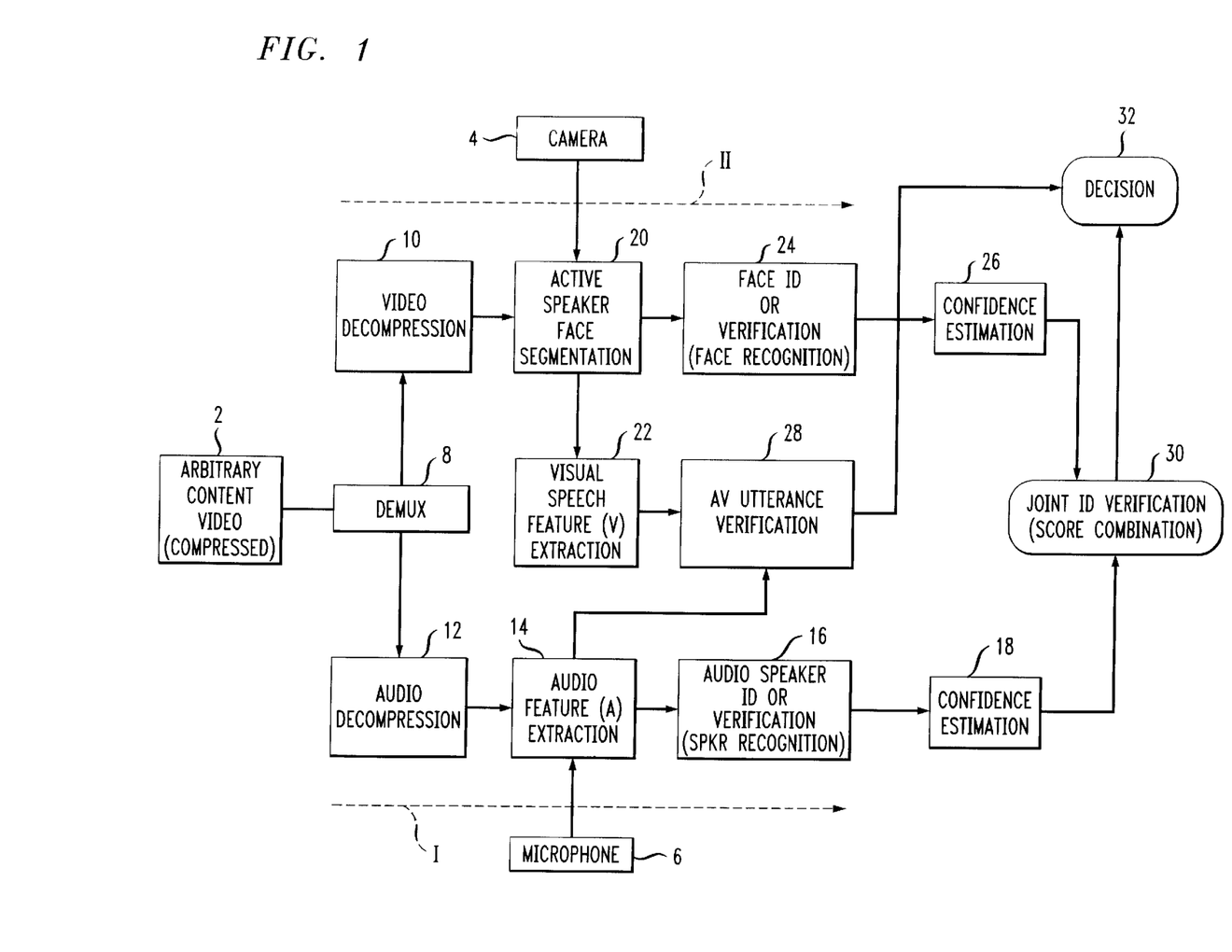
FIG. 1 is a block diagram of art audio-visual speaker recognition and utterance verification system according to an illustrative score or decision fusion embodiment of the present invention.

Referring initially to FIG. 1, a block diagram of an audio-visual speaker recognition and utterance verification system according to an illustrative embodiment of the present invention is shown. This particular illustrative embodiment, as will be explained, depicts audio-visual speaker recognition using a decision fusion approach.

It is to be appreciated that the system of the invention may receive input signals from a variety of sources. That is, the input signals for processing in accordance with the invention may be provided from a real-time (e.g., live feed) source or an archival (e.g., stored) source. Arbitrary content video 2 is an input signal that may be received from either a live source or archival source. Preferably, the system may accept, as arbitrary content video 2, video compressed in accordance with a video standard such as the Moving Picture Expert Group-2 (MPEG-2) standard. To accommodate such a case, the system includes a video demultiplexer 8 which separates the compressed audio signal from the compressed video signal. The video signal is then decompressed in video decompressor 10, while the audio signal is decompressed in audio decompressor 12. The decompression algorithms are standard MPEG-2 techniques and thus will not be further described. In any case, other forms of compressed video may be processed in accordance with the invention.

It is to be further appreciated that one of the advantages that the invention provides is the ability to process arbitrary content video. That is, previous systems that have attempted to utilize visual cues from a video source in the context of speech recognition have utilized video with controlled conditions, i.e., non-arbitrary content video. That is, the video content included only faces from which the visual cues were taken in order to try to recognize short commands or single words in a predominantly noiseless environment. However, as will be explained in detail below, the system of the present invention is able to process arbitrary content video which may not only contain faces but may also contain arbitrary background objects in a noisy environment. One example of arbitrary content video is in the context of broadcast news. Such video can possibly contain a newsperson speaking at a location where there is arbitrary activity and noise in the background. In such a case, as will be explained, the invention is able to locate and track a face and, more particularly, a mouth and/or other facial features, to determine what is relevant visual information to be used in more accurately identifying and/or verifying the speaker.

Alternatively, the system of the present invention is capable of receiving real-time arbitrary content directly from a video camera 4 and microphone 6. While the video signals received from the camera 4 and the audio signals received from the microphone 6 are shown in FIG. 1 as not being compressed, they may be compressed and therefore need to be decompressed in accordance with the applied compression scheme.

It is to be understood that the video signal captured by the camera 4 does not necessarily have to be of any particular type. That is, the face detection and recognition techniques of the invention may process images of any wavelength such as, e.g., visible and/or non-visible electromagnetic spectrum images. By way of example only, this may include infrared (IR) images (e.g., near, mid and far field IR video) and radio frequency (RF) images. Accordingly, the system may perform audio-visual speaker recognition and utterance verification techniques in poor lighting conditions, changing lighting conditions, or in environments without light. For example, the system may be installed in an automobile or some other form of vehicle and capable of capturing IR images so that improved speaker recognition may be performed. Because video information (i.e., including visible and/or non-visible electromagnetic spectrum images) is used in the speaker recognition process in accordance with the invention, the system is less susceptible to recognition errors due to noisy conditions, which significantly hamper conventional speaker recognition systems that use only audio information. Additionally, as disclosed in Francine J. Prokoski and Robert R. Riedel, "Infrared Identification of Faces and Body Parts," BIOMETRICS, Personal Identification in Networked Society, Kluwer Academic Publishers, 1999, IR cameras introduce additional very robust biometric features which uniquely characterize individuals very well.

A phantom line denoted by Roman numeral I represents the processing path the audio information signal takes within the system, while a phantom line denoted by Roman numeral II represents the processing path the video information signal takes within the system. First, the audio signal path I will be discussed, then the video signal path II, followed by an explanation of how the two types of information are combined to provide improved speaker recognition accuracy.

The system includes an auditory feature extractor 14. The feature extractor 14 receives an audio or speech signal and, as is known in the art, extracts spectral features from the signal at regular intervals. The spectral features are in the form of acoustic feature vectors (signals) which are then passed on to an audio speaker recognition module 16. As mentioned, the audio signal may be received from the audio decompressor 12 or directly from the microphone 6, depending on the source of the video. Before acoustic vectors are extracted, the speech signal may be sampled at a rate of 16 kilohertz (kHz). A frame may consist of a segment of speech having a 25 millisecond (msec) duration. In such an arrangement, the extraction process preferably produces 24 dimensional acoustic cepstral vectors via the process described below. Frames are advanced every 10 msec to obtain succeeding acoustic vectors.

First, in accordance with a preferred acoustic feature extraction process, magnitudes of discrete Fourier transforms of samples of speech data in a frame are considered in a logarithmically warped frequency scale. Next, these amplitude values themselves are transformed to a logarithmic scale. The latter two steps are motivated by a logarithmic sensitivity of human hearing to frequency and amplitude. Subsequently, a rotation in the form of discrete cosine transform is applied. One way to capture the dynamics is to use the delta (first-difference) and the delta-delta (second-order differences) information. An alternative way to capture dynamic information is to append a set of (e.g., four) preceding and succeeding vectors to the vector under consideration and then project the vector to a lower dimensional space, which is chosen to have the most discrimination. The latter procedure is known as Linear Discriminant Analysis (LDA) and is well known in the art. It is to be understood that other variations on features may be used, e.g., LPC cepstra, PLP, etc., and that the invention is not limited to any particular type.

After the acoustic feature vectors, denoted in FIG. 1 by the letter A, are extracted, they are provided to the audio speaker recognition module 16. It is to be understood that the module 16 may perform speaker identification and/or speaker verification using the extracted acoustic feature vectors. The processes of speaker identification and verification may be accomplished via any conventional acoustic information speaker recognition system. For example, speaker recognition module 16 may implement the recognition techniques described in the U.S. patent application identified by Ser. No. 08/788,471, filed on Jan. 28, 1997, and entitled: "Text Independent Speaker Recognition for Transparent Command Ambiguity Resolution and Continuous Access Control," the disclosure of which is incorporated herein by reference.

An illustrative speaker identification process for use in module 16 will now be described. The illustrative system is disclosed in H. Beigi, S. H. Maes, U. V. Chaudari and J. S. Sorenson, "IBM model-based and frame-by-frame speaker recognition," Speaker Recognition and its Commercial and Forensic Applications, Avignon, France 1998. The illustrative speaker identification system may use two techniques: a model-based approach and a frame-based approach. In the experiments described herein, we use the frame-based approach for speaker identification based on audio. The frame-based approach can be described in the following manner.

Let $M_i$ be the model corresponding to the $i^{th}$ enrolled speaker. $M_i$ is represented by a mixture Gaussian model defined by the parameter set $\{\mu_{i,j}, \Sigma_{i,j}, p_{i,j}\}_{j=1,\ldots,n}$, consisting of the mean vector, covariance matrix and mixture weights for each of the n, components of speaker i's model. These models are created using training data consisting of a sequence of K frames of speech with d-dimensional cepstral feature vectors, $\{f_m\}_{m=1,\ldots,K}$. The goal of speaker identification is to find the model, $M_i$, that best explains the test data represented by a sequence of N frames, $\{f_n\}_{n=1,\ldots,N}$. We use the following frame-based weighted likelihood distance measure, $d_{i,n}$, in making the decision:

$$d_{i,n} = -\log\left[\sum_{j=1}^{n_i} p_{i,j} p\left(f_n \mid \mu_{i,j}, \sum_{i,j}\right)\right].$$

The total distance $D_i$ of model $M_i$ from the test data is then taken to be the sum of the distances over all the test frames:

$$D_i = \sum_{n=1}^{N} d_{i,n}.$$

Thus, the above approach finds the closest matching model and the person whose model that represents is determined to be the person whose utterance is being processed.

Speaker verification may be performed in a similar manner, however, the input acoustic data is compared to determine if the data matches closely enough with stored models. If the comparison yields a close enough match, the person uttering the speech is verified. The match is accepted or rejected by comparing the match with competing models. These models can be selected to be similar to the claimant speaker or be speaker independent (i.e., a single or a set of speaker independent models). If the claimant wins and wins with enough margin (computed at the level of the likelihood or the distance to the models), we accept the claimant. Otherwise, the claimant is rejected. It should be understood that, at enrollment, the input speech is collected for a speaker to build the mixture gaussian model $M_i$ that characterize each speaker.

Referring now to the video signal path II of FIG. 1, the methodologies of processing visual information according to the invention will now be explained. The audio-visual speaker recognition and utterance verification system of the invention includes an active speaker face segmentation module 20 and a face recognition module 24. The active speaker face segmentation module 20 can receive video input from one or more sources, e.g., video decompressor 10, camera 4, as explained above. It is to be appreciated that speaker face detection can also be performed directly in the compressed data domain and/or from audio and video information rather than just from video information. In any case, segmentation module 20 generally locates and tracks the speaker's face and facial features within the arbitrary video background. This will be explained in detail below. From data provided from the segmentation module 22, an identification and/or verification operation may be performed by recognition module 24 to identify and/or verify the face of the person assumed to be the speaker in the video. Verification can also be performed by adding score thresholding or competing models. Thus, the visual mode of speaker identification is implemented as a face recognition system where faces are found and tracked in the video sequences, and recognized by comparison with a database of candidate face templates. As will be explained later, utterance verification provides a technique to verify that the person actually uttered the speech used to recognize him.

Face detection and recognition may be performed in a variety of ways. For example, in an embodiment employing an infrared camera 4, face detection and identification may be performed as disclosed in Francine J. Prokoski and Robert R. Riedel, "Infrared Identification of Faces and Body Parts," BIOMETRICS, Personal Identification in Networked Society, Kluwer Academic Publishers, 1999. In a preferred embodiment, techniques described in Andrew Senior, "Face and feature finding for face recognition system," $2^{nd}$ Int.

Conf. On Audio-Video based Biometric Person Authentication, Washington D.C., March 1999 are employed. The following is an illustrative description of face detection and recognition as respectively performed by segmentation module 22 and recognition module 24.

Face Detection

Faces can occur at a variety of scales, locations and orientations in the video frames. In this system, we make the assumption that faces are close to the vertical, and that there is no face smaller than 66 pixels high. However, to test for a face at all the remaining locations and scales, the system searches for a fixed size template in an image pyramid. The image pyramid is constructed by repeatedly down-sampling the original image to give progressively lower resolution representations of the original frame. Within each of these sub-images, we consider all square regions of the same size as our face template (typically 11×11 pixels) as candidate face locations. A sequence of tests is used to test whether a region contains a face or not.

First, the region must contain a high proportion of skin-tone pixels, and then the intensities of the candidate region are compared with a trained face model. Pixels falling into a pre-defined cuboid of hue-chromaticity-intensity space are deemed to be skin tone, and the proportion of skin tone pixels must exceed a threshold for the candidate region to be considered further.

The face model is based on a training set of cropped, normalized, grey-scale face images. Statistics of these faces are gathered and a variety of classifiers are trained based on these statistics. A Fisher linear discriminant (FLD) trained with a linear program is found to distinguish between faces and background images, and "Distance from face space" (DFFS), as described in M. Turk and A. Pentland, "Eigenfaces for Recognition," Journal of Cognitive Neuro Science, vol. 3, no. 1, pp. 71–86, 1991, is used to score the quality of faces given high scores by the first method. A high combined score from both these face detectors indicates that the candidate region is indeed a face. Candidate face regions with small perturbations of scale, location and rotation relative to high-scoring face candidates are also tested and the maximum scoring candidate among the perturbations is chosen, giving refined estimates of these three parameters.

In subsequent frames, the face is tracked by using a velocity estimate to predict the new face location, and models are used to search for the face in candidate regions near the predicted location with similar scales and rotations. A low score is interpreted as a failure of tracking, and the algorithm begins again with an exhaustive search.

Face Recognition

Having found the face, K facial features are located using the same techniques (FLD and DFFS) used for face detection. Features are found using a hierarchical approach where large-scale features, such as eyes, nose and mouth are first found, then sub-features are found relative to these features. As many as 29 sub-features are used, including the hairline, chin, ears, and the corners of mouth, nose, eyes and eyebrows. Prior statistics are used to restrict the search area for each feature and sub-feature relative to the face and feature positions, respectively. At each of the estimated sub-feature locations, a Gabor Jet representation, as described in L. Wiskott and C. von der Malsburg, "Recognizing Faces by Dynamic Link Matching," Proceedings of the International Conference on Artificial Neural Networks, pp. 347–352, 1995, is generated. A Gabor jet is a set of two-dimensional Gabor filters—each a sine wave modulated by a Gaussian. Each filter has scale (the sine wavelength and Gaussian standard deviation with fixed ratio) and orientation (of the sine wave). We use five scales and eight orientations, giving 40 complex coefficients (a(j), j=1, . . . , 40) at each feature location.

A simple distance metric is used to compute the distance between the feature vectors for trained faces and the test candidates. The distance between the $i^{th}$ trained candidate and a test candidate for feature k is defined as:

$$S_{ik} = \frac{\sum_j a(j)a_i(j)}{\sqrt{\sum_j a(j)^2 \sum_j a_i(j)^2}}$$

A simple average of these similarities, $S_i = 1/K \Sigma_1^K S_{ik}$, gives an overall measure for the similarity of the test face to the face template in the database. Accordingly, based on the similarity measure, an identification and/or verification of the person in the video sequence under consideration is made.

Next, the results of the face recognition module 24 and the audio speaker recognition module 16 are provided to respective confidence estimation blocks 26 and 18 where confidence estimation is performed. Confidence estimation refers to a likelihood or other confidence measure being determined with regard to the recognized input. In one embodiment, the confidence estimation procedure may include measurement of noise levels respectively associated with the audio signal and the video signal. These levels may be measured internally or externally with respect to the system. A higher level of noise associated with a signal generally means that the confidence attributed to the recognition results associated with that signal is lower. Therefore, these confidence measures are taken into consideration during the weighting of the visual and acoustic results discussed below.

Given the audio-based speaker recognition and face recognition scores provided by respective modules 16 and 24, audio-visual speaker identification/verification may be performed by a joint identification/verification module 30 as follows. The top N scores are generated-based on both audio and video-based identification techniques. The two lists are combined by a weighted sum and the best-scoring candidate is chosen. Since the weights need only to be defined up to a scaling factor, we can define the combined score $S_i^{av}$ as a function of the single parameter $\alpha$:

$$S_i^{av} = \cos \alpha D_i + \sin \alpha S_i.$$

The mixture angle $\alpha$ has to be selected according to the relative reliability of audio identification and face identification. One way to achieve this is to optimize $\alpha$ in order to maximize the audio-visual accuracy on some training data. Let us denote by $D_i(n)$ and $S_i(n)$ the audio ID (identification) and video ID score for the $i^{th}$ enrolled speaker (i=1 . . . P) computed on the $n^{th}$ training clip. Let us define the variable $T_i(n)$ as zero when the $n^{th}$ clip belongs to the $i^{th}$ speaker and one otherwise. The cost function to be minimized is the empirical error, as discussed in V. N. Vapnik, "The Nature of Statistical Learning Theory, Springer, 1995, that can be written as:

$$C(\alpha) = \frac{1}{N}\sum_{n=1}^{N} T_{\hat{i}}(n) \quad \text{where } \hat{i} = \arg\max_i S_i^{av}(n),$$

and where:

$$S_i^{av}(n) = \cos\alpha D_i(n) + \sin\alpha S_i(n).$$

In order to prevent over-fitting, one can also resort to the smoothed error rate, as discussed in H. Ney, "On the Probabilistic Interpretation of Neural Network Classification and Discriminative Training Criteria," IEEE Transactions on Pattern Analysis and Machine Intelligence," vol. 17, no. 2, pp. 107–119, 1995, defined as:

$$C'(\alpha) = \frac{1}{N}\sum_{n=1}^{N}\sum_{i} T_i(n) \frac{\exp^{\eta S_i^{av}(n)}}{\sum_{j=1}^{P}\exp^{\eta S_j^{av}(n)}}.$$

When η is large, all the terms of the inner sum approach zero, except for i=î, and C'(α) approaches the raw error count C(α). Otherwise, all the incorrect hypotheses (those for which $T_i(n)=1$) have a contribution that is a decreasing function of the distance between their score and the maximum score. If the best hypothesis is incorrect, it has the largest contribution. Hence, by minimizing the latter cost function, one tends to maximize not only the recognition accuracy on the training data, but also the margin by which the best score wins. This function also presents the advantage of being differentiable, which can facilitate the optimization process when there is more than one parameter.

The present invention provides another decision or score fusion technique derived by the previous technique, but which does not require any training. It consists in selecting at testing time, for each clip, the value of α in a given range which maximizes the difference between the highest and the second highest scores. The corresponding best hypothesis I(n) is then chosen. We have:

$$\hat{\alpha}(n) = \arg\max_{\alpha_1 < \alpha_2 < \alpha_3} [\max_i S_i^{av}(n) - 2nd \max_i S_i^{av}(n)],$$

and $$I(n) = \arg\max_i [\cos\hat{\alpha}(n) D_i(n) + \sin\hat{\alpha}(n) S_i(n)].$$

The values of $\alpha_1$ and $\alpha_2$ should be restricted to the interval $$[0 \ldots \frac{\pi}{2}].$$

The rationale of this technique is the following. In the {$D_i$, $S_i$} plane, the point corresponding to the correct decision is expected to lie apart from the others. The fixed linear weights assume that the "direction" where this point can be found relative to the others is always the same, which is not necessarily true. The equation relating to $\hat{\alpha}(n)$ and I(n) above find the point which lies farthest apart from the others in any direction between $\alpha_1$ and $a_2$.

Another interpretation is that the distance between the best combined score and the second best is an indicator of the reliability of the decision. The proposed method adaptively chooses the weights which maximize that confidence measure.

Thus, the joint identification/verification module 30 makes a decision with regard to the speaker. In a verification scenario, based on one of the techniques described above, a decision may be made to accept the speaker if he is verified via both the acoustic path and the visual path. However, he may be rejected if he is only verified through one of the paths. In an identification scenario, for example, the top three scores from the face identification process may be combined with the top three scores from the acoustic speaker identification process. Then, the highest combined score is identified as the speaker.

In a preferred embodiment, before the system decides make a final disposition with respect to the speaker, the system performs an utterance verification operation. It is to be appreciated that utterance verification is performed by the utterance verification module 28 (FIG. 1) based on input from the acoustic feature extractor 14 and a visual speech feature extractor 22. Before describing utterance verification, a description of illustrative techniques for extracting visual speech feature vectors will follow. Particularly, the visual speech feature extractor 22 extracts visual speech feature vectors (e.g., mouth or lip-related parameters), denoted in FIG. 1 as the letter V, from the face detected in the video frame by the active speaker face segmentation module 20.

Examples of visual speech features that may be extracted are grey scale parameters of the mouth region; geometric/model based parameters such as area, height, width of mouth region; lip contours arrived at by curve fitting, spline parameters of inner/outer contour; and motion parameters obtained by three dimensional tracking. Still another feature set that may be extracted via module 22 takes into account the above factors. Such technique is known as Active Shape modeling and is described in Iain Matthews, "Features for audio visual speech recognition," Ph.D dissertation, School of Information Systems, University of East Angalia, January 1998.

Thus, while the visual speech feature extractor 22 may implement one or more known visual feature extraction techniques, in one embodiment, the extractor extracts grey scale parameters associated with the mouth region of the image. Given the location of the lip corners, after normalization of scale and rotation, a rectangular region containing the lip region at the center of the rectangle is extracted from the original decompressed video frame. Principal Component Analysis (PCA), as is known, may be used to extract a vector of smaller dimension from this vector of grey-scale values.

Another method of extracting visual feature vectors that may be implemented in module 22 may include extracting geometric features. This entails extracting the phonetic/visemic information from the geometry of the lip contour and its time dynamics. Typical parameters may be the mouth corners, the height or the area of opening, the curvature of inner as well as the outer lips. Positions of articulators, e.g., teeth and tongue, may also be feature parameters, to the extent that they are discernable by the camera.

The method of extraction of these parameters from grey scale values may involve minimization of a function (e.g., a cost function) that describes the mismatch between the lip contour associated with parameter values and the grey scale image. Color information may be utilized as well in extracting these parameters.

From the captured (or demultiplexed and decompressed) video stream one performs a boundary detection, the ultimate result of which is a parameterized contour, e.g., circles, parabolas, ellipses or, more generally, spline contours, each of which can be described by a finite set of parameters.

Still other features that can be extracted include two or three dimensional wire-frame model-based techniques of the type used in the computer graphics for the purposes of animation. A wire-frame may consist of a large number of triangular patches. These patches together give a structural representation of the mouth/lip/jaw region, each of which contain useful features in speech-reading. These parameters could also be used in combination with grey scale values of the image to benefit from the relative advantages of both schemes.

Given the extracted visual speech feature vectors (V) from extractor 22 and the acoustic feature vectors(A) from extractor 14, the AV utterance verifier 28 performs verification. Verification may involve a comparison ofthe resulting likelihood, for example, of aligning the audio on a random sequence of visemes. As is known, visemes, or visual phonemes, are generally canonical mouth shapes that accompany speech utterances which are categorized and pre-stored similar to acoustic phonemes. A goal associated with utterance verification is to make a determination that the speech used to verify the speaker in the audio path I and the visual cues used to verify the speaker in the video path II correlate or align. This allows the system to be confident that the speech data that is being used to recognize the speaker is actually what the speaker uttered. Such a determination has many advantages. For example, from the utterance verification, it can be determined whether the user is lip synching to a pre-recorded tape playback to attempt to fool the system. Also, from utterance verification, errors in the audio decoding path may be detected. Depending on the number of errors, a confidence measure may be produced and used by the system.

Figure 2:
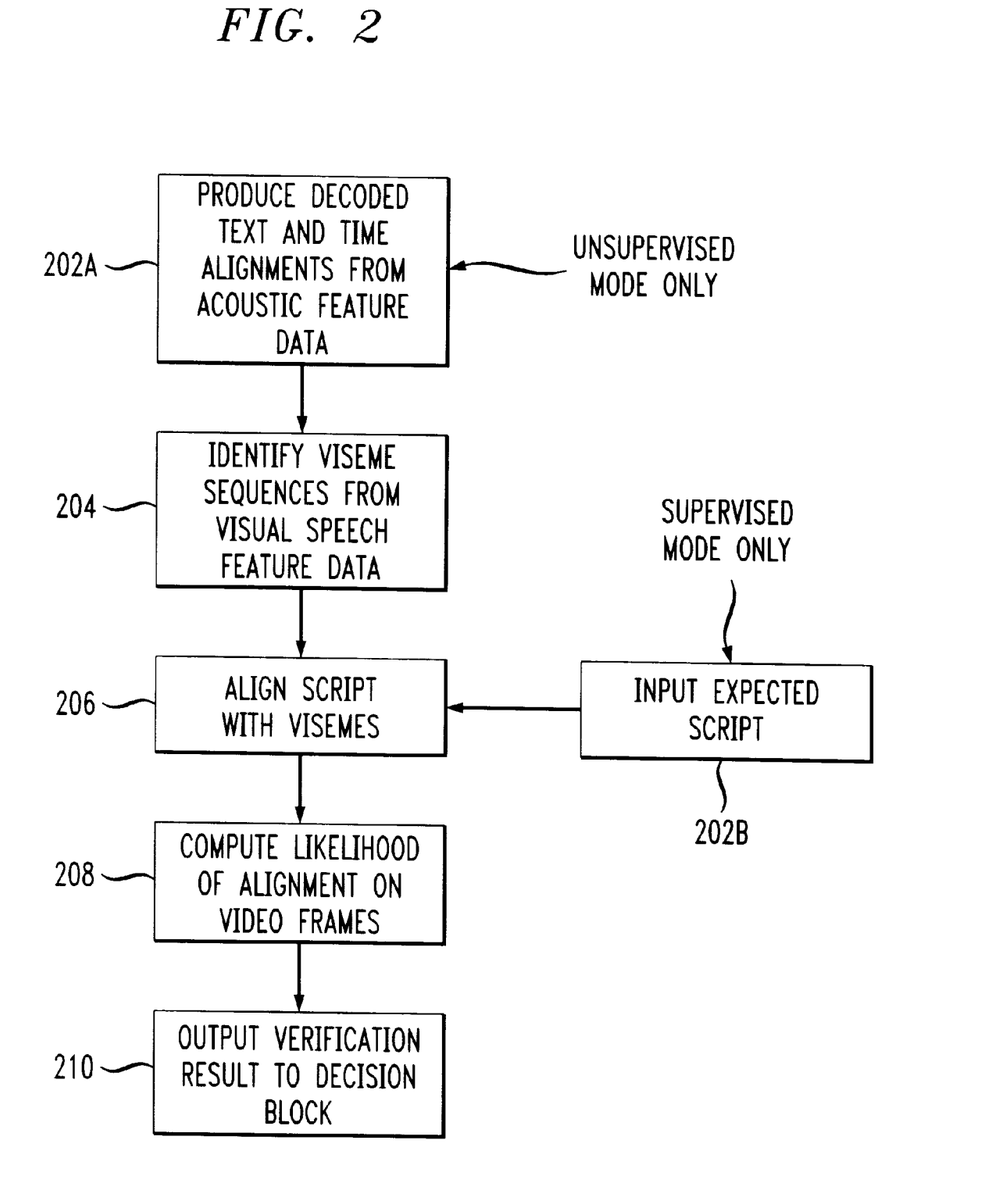
FIG. 2 is a flow diagram of an utterance verification methodology according to an illustrative embodiment of the present invention.

Referring now to FIG. 2, a flow diagram of an utterance verification methodology according to an illustrative embodiment of the present invention is shown. Utterance verification may be performed in: (i) a supervised mode, i.e., when the text (script) is known and available to the system; or (ii) an unsupervised mode, i.e., when the text (script) is not known and available to the system.

Thus, in step 202A (unsupervised mode), the uttered speech to be verified may be decoded by classical speech recognition techniques so that a decoded script and associated time alignments are available. This is accomplished using the feature data from the acoustic feature extractor 14. Contemporaneously, in step 204, the visual speech feature vectors from the visual feature extractor 22 are used to produce a visual phonemes or visemes sequence.

Next, in step 206, the script is aligned with the visemes. A rapid (or other) alignment may be performed in a conventional manner in order to attempt to synchronize the two information streams. For example, in one embodiment, rapid alignment as disclosed in the U.S. patent application identified by Ser. No. 09/015,150 and entitled "Apparatus and Method for Generating Phonetic Transcription from Enrollment Utterances," the disclosure of which is incorporated by reference herein, may be employed. Note that in a supervised mode, step 202B replaces step 202A such that the expected or known script is aligned with the visemes in step 206, rather than the decoded version of the script. Then, in step 208, a likelihood on the alignment is computed to determine how well the script aligns to the visual data. The results of the likelihood are then provided to a decision block 32 which, along with the results of the score module 30, decides on a final disposition of the speaker, e.g., accept him or reject him. This may be used to allow or deny access to a variety of devices, applications, facilities, etc.

So, in the unsupervised utterance verification mode, the system is able to check that the user is indeed speaking rather than using a playback device and moving his lips. Also, a priori, errors may be detected in the audio decoding. In the supervised mode, the system is able to prove that the user uttered the text if the recognized text is sufficiently aligned or correlated to the extracted lip parameters.

It is to be appreciated that utterance verification in the unsupervised mode can be used to perform speech detection as disclosed in the U.S. patent application identified by docket no. YO999-317 and entitled: "Methods And Apparatus for Audio-Visual Speech Detection and Recognition," filed concurrently herewith and incorporated by reference herein. Indeed, if acoustic and visual activities are detected, they can be verified against each other. When the resulting acoustic utterance is accepted, the system considers that speech is detected. Otherwise, it is considered that extraneous activities are present.

Figure 3:
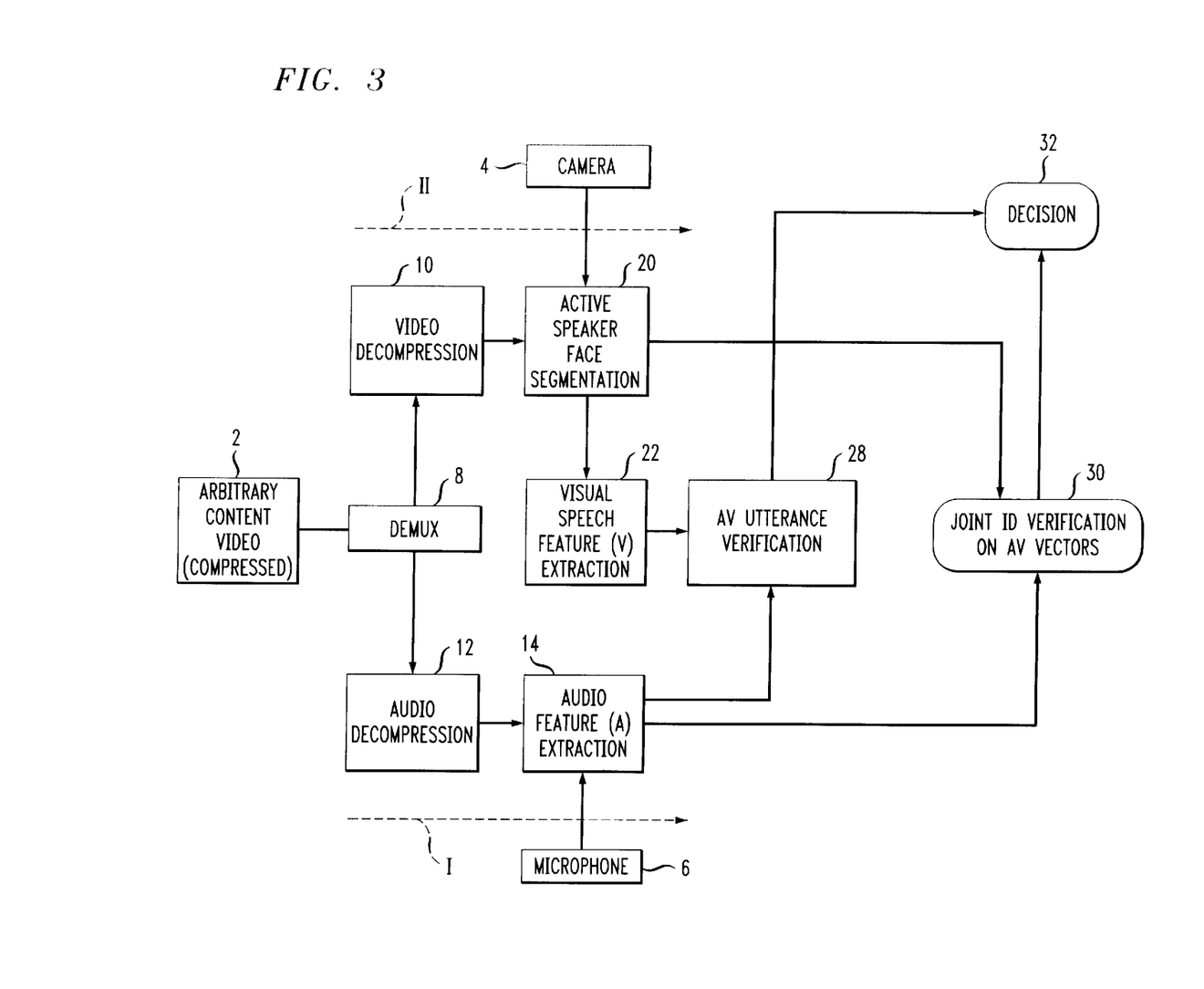
FIG. 3 is a block diagram of an audio-visual speaker recognition and utterance verification system according to an illustrative feature fusion embodiment of the present invention.

Referring now to FIG. 3, an alternative embodiment of an audio-visual speaker recognition and utterance verification system is shown. Whereas the embodiment of FIG. 1 illustrated a decision or score fusion approach, the embodiment of FIG. 3 illustrates a feature fusion approach. The operations of the system of FIG. 3 are substantially the same as those described above with respect to FIG. 1, however, the embodiment of FIG. 3 has the added advantage making an identification/verification decision on a combined AV feature vector. In accordance with the feature fusion approach, a single feature vector is built combining acoustic features (e.g., mel cepstra and derivatives) from the acoustic feature extractor 14 and detected visual facial features (e.g., face decomposition with respect to principal directions or face morphology parameters) from the face segmentation module 20.

These features are then combined to form a single audio-visual feature vector. There are many ways to perform this combination. One way is to concatenate the audio feature data and the visual feature data. However, since MPEG-2 decompressed video produces 30 frames per second, whereas the audio frames are spaced approximately 10 msec in time, there is a need for synchronization between features. The requirement for a larger frame rate in the audio domain is fulfilled by creating artificial frames by interpolation from adjoining video frames. Different conventional interpolation techniques can be used for this purpose. Examples are linear interpolation from frames immediately preceding and following the time instant, or other polynomial interpolation techniques such as ones which consider more than one frame in the past and future of the time instant when the audio frame occurs.

A decision operation such as, for example, that described above with respect to module 30 in FIG. 1 is performed on the combined audio-visual feature vectors. As shown, utterance verification may also be applied in the final decision block 32.

Figure 4:
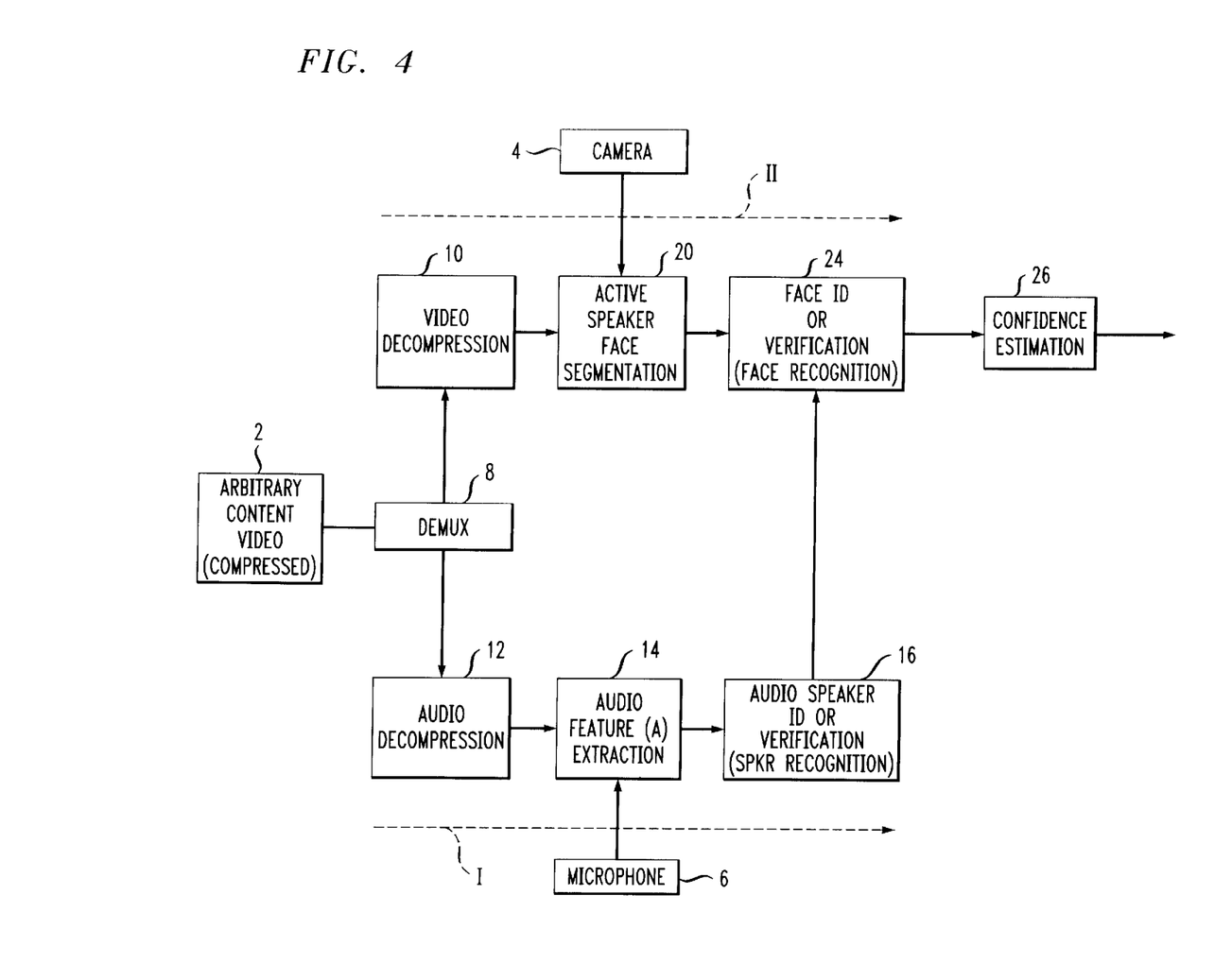
FIG. 4 is a block diagram of an audio-visual speaker recognition and utterance verification system according to an illustrative re-scoring embodiment of the present invention.
Figure 5:
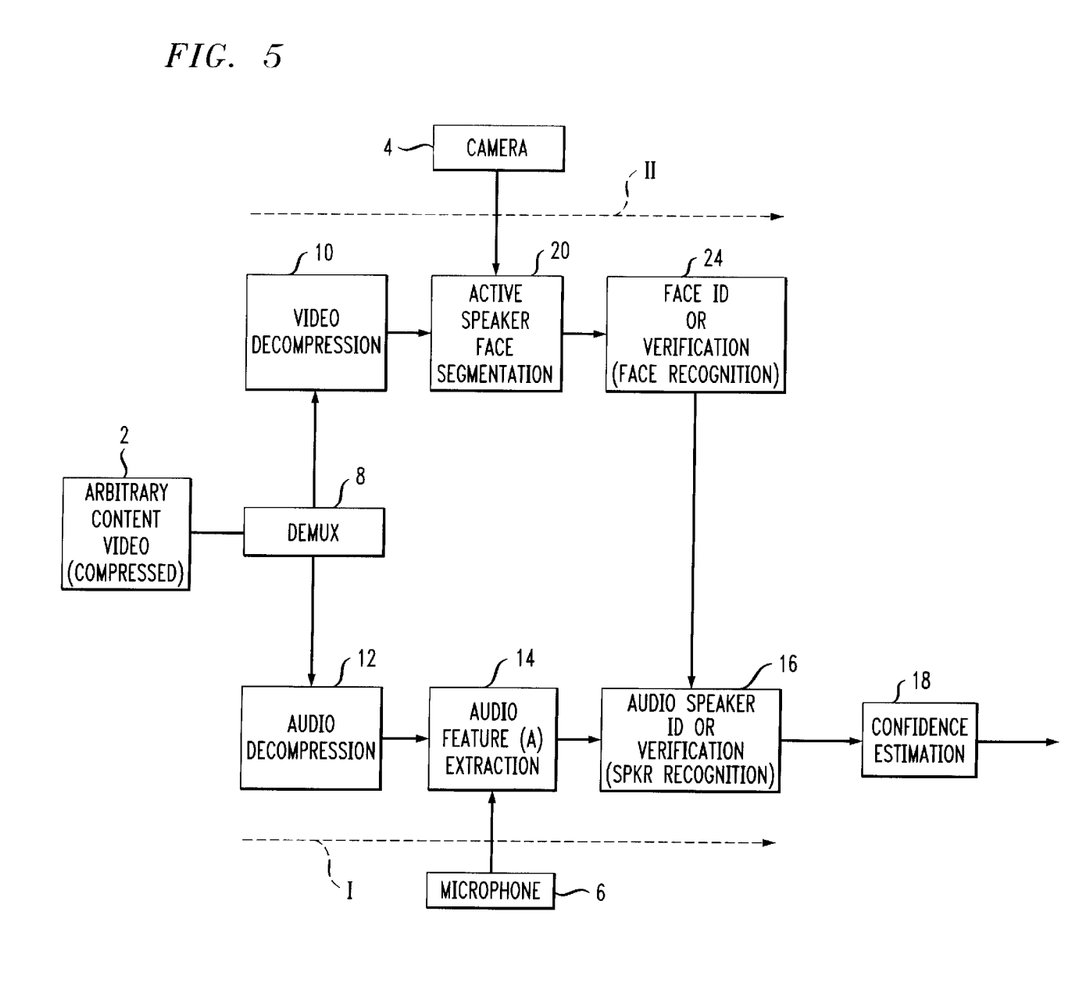
FIG. 5 is a block diagram of an audio-visual audio-visual speaker recognition and utterance verification system according to another illustrative re-scoring embodiment of the present invention.

Referring now to FIGS. 4 and 5, alternative embodiments of an audio-visual speaker recognition system are shown. These embodiments illustrate a re-scoring approach. The operations of the system of FIGS. 4 and 5 are substantially the same as those described above with respect to FIG. 1, however, the embodiments of FIGS. 4 and 5 have the added advantage of using the video information and the audio information in a serial manner to re-score the other. In FIG. 4, the results of the audio speaker recognizer 16 are provided to the face recognizer 24 to be used in the face recognition operation. In FIG. 5, the results of the face recognizer 24 are provided to the audio speaker recognizer 16 to be used in the audio speaker recognition operation. In either embodiment, the verification/identification process performed in one modality is being used to modify the verification/ identification process performed in the other modality. Then, a single confidence estimation and decision is made. For example, the results of one of the recognition processes, say from the audio stream, may be used to narrow the candidates considered in the video stream. By way of further example, the video stream may produce competing models of persons who look like the speaker and, based only on these persons, the speaker may be acoustically identified or verified. Given the inventive teachings herein, one of ordinary skill in the art will contemplate other embodiments and implementations.

It is to be understood that the system of the invention, as depicted in FIGS. 1 and 3–5, may perform user enrollment. The system may employ enrollment techniques as are known in the art. For enrollment of acoustic information, the input speech is collected for a speaker to build the mixture gaussian model $M_I$ that characterize each speaker. For enrollment of facial information, techniques disclosed in Andrew Senior, "Face and feature finding for face recognition system," $2^{nd}$ Int. Conf. On Audio-Video based Biometric Person Authentication, Washington DC, March 1999, may be employed. For enrollment of IR images, techniques disclosed in Francine J. Prokoski and Robert R. Riedel, "Infrared Identification of Faces and Body Parts," BIOMETRICS, Personal Identification in Networked Society, Kluwer Academic Publishers, 1999, may be employed. The resulting biometrics are the combination of the different biometrics for each modality (possibly combined for the feature fusion approach where extra rotation and LDA can be applied on the combined feature).

Figure 6:
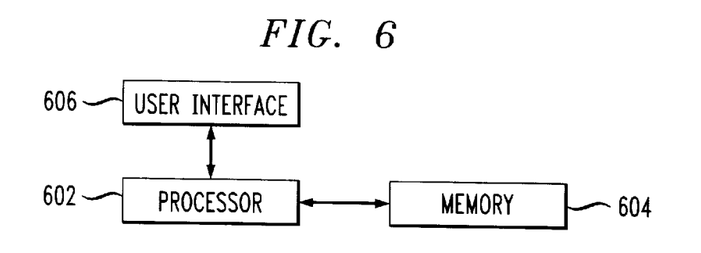
FIG. 6 is a block diagram of an illustrative hardware implementation of an audio- visual audio-visual speaker recognition and utterance verification system according to the invention.

Referring to FIG. 6, a block diagram of an illustrative hardware implementation of an audio-visual speaker recognition and utterance verification system according to the invention is shown. In this particular implementation, a processor 602 for controlling and performing the various operations associated with the illustrative systems of the invention depicted in FIGS. 1 and 3–5 is coupled to a memory 604 and a user interface 606. It is to be appreciated that the term "processor" as used herein is intended to include any processing device, such as, for example, one that includes a CPU (central processing unit). For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), a flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. The user interface 606 may also include a microphone for receiving user speech.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIG. 1 and 3–5 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Experimental Results

All the experiments were carried out on CNN and CSPAN video data collected as part of the ARPA HUB4 broadcast news transcription task by the linguistic data consortium (LDC). We digitized 20–40 second clips of anchors and reporters with frontal shots of their faces from the video tapes into MPEG-2 format. The training data contained 76 clips of 76 speakers while the test data consisted of 154 additional clips from the same 76 speakers.

A key challenge for audio-based speaker identification is to improve performance when there is a significant mismatch between testing and training conditions either due to background noise or channel mismatch. To illustrate the benefit of combining video information under these conditions, we artificially generated mismatch between training and test conditions. Noise mismatch was created by adding speech noise to the audio signal at a signal-to-noise ratio of about 10 dB. Telephone channel mismatch was created by passing the wideband audio signal through a telephone channel filter and down-sampling it to 8 kHz. The telephone channel filter is a band-pass filter between 300 Hz and 3300 Hz.

The audio-based identification algorithm that we tested on telephone channel data was also trained on telephone channel data. On noisy data, an audio-based identification algorithm trained on clean data was used. Linear fusion techniques were tested both in matched and unmatched conditions.

Figure 7:
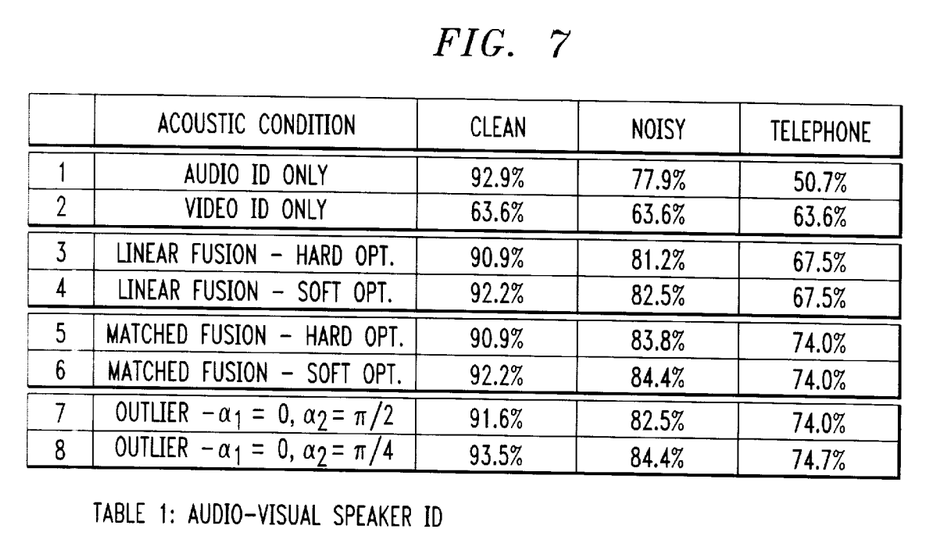
FIG. 7 is a tabular representation of some experimental results.

Table 1 in FIG. 7 shows the recognition accuracy for different testing conditions and fusion techniques. The first two rows give the accuracy of audio-only ID and video-only ID. The next four rows show the results of several linear fusion experiments. Since training data is needed for the optimization of the fusion weights, the 154 clips have been split into two sets of 77, with occurrences of the same speaker evenly divided. The fusion weights have been trained on set 1, then tested on set 2, and conversely. The total number of tests is 154, like in the first two rows. Hard optimization refers to the raw error count of the C($\alpha$) equation above, while soft optimization refers to the smoothed cost function of the C'($\alpha$) equation. For noisy data and telephone channel data, rows 3 and 4 refer to fusion weights optimized on clean data (of set 1, when testing on set 2, and conversely), i.e., fusion mismatch conditions, while rows 5 and 6 refer to fusion weights optimized on noisy data or telephone channel data (matched fusion). Finally, rows 7 and 8 show the result of the "farthest outlier" method. The choice $$\alpha_2 = \frac{\pi}{4}$$

(row 8) is motivated by the prior knowledge we have about the reliability of video and audio ID scores: the classifier is allowed to select a hypothesis on the grounds of a high audio score alone, but a high video score alone is not enough.

Linear joint audio-visual identification significantly improves the accuracy on noisy audio data, while it does slightly worse on clean data. A detailed analysis of the results shows that the amount of training data is insufficient to properly train the fusion weights in the latter case. The "farthest outlier" technique, however, which does not require any training, is able to overcome this problem. It also appears that the smoothed cost function helps generalizing from one test set to the other, and from matched to unmatched conditions.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of performing speaker recognition, the method comprising the steps of:
   processing a video signal associated with an arbitrary content video source;
   processing an audio signal associated with the video signal; and
   making at least one of an identification and verification decision based on the processed audio signal and the processed video signal.

2. The method of claim 1, wherein the video signal processing operation comprises the step of detecting whether the video signal associated with the arbitrary content video source contains one or more faces.

3. The method of claim 2, wherein the video signal processing operation further comprises the step of detecting one or more facial features on one or more detected faces.

4. The method of claim 3, wherein at least one of face and facial feature detection employ Fisher linear discriminant (FLD) analysis.

5. The method of claim 3, wherein at least one of face and facial feature detection employ a distance from face space (DFFS) measure.

6. The method of claim 3, wherein the video signal processing operation further comprises the step of recognizing one or more faces from the detecting faces using the detected facial features.

7. The method of claim 6, wherein the video signal processing operation further comprises the step of performing a confidence estimation procedure on results of the face recognition operation.

8. The method of claim 6, wherein the audio signal processing operation comprises the step of recognizing a speaker associated with the audio signal.

9. The method of claim 8, wherein the audio signal processing operation further comprises the step of performing a confidence estimation procedure on results of the audio speaker recognition operation.

10. The method of claim 8, wherein respective results of the face recognition and audio speaker recognition operations are used to make at least one of the identification decision and the verification decision.

11. The method of claim 10, wherein the results of one of the recognition operations are used to modify the results of the other of the recognition operations.

12. The method of claim 11, wherein the decision is based on the modified results.

13. The method of claim 10, wherein the results are combined such that one set of top N respective scores are generated for the face recognition and audio speaker recognition operations and used to make the decision.

14. The method of claim 10, wherein the results include the top N respective scores generated during the face recognition and audio speaker recognition operations.

15. The method of claim 14, wherein the top N respective scores are combined using a mixture parameter.

16. The method of claim 15, wherein the mixture parameter is selected within a range which maximizes the highest and the second highest scores.

17. The method of claim 15, wherein the mixture parameter is selected according to a reliability measure associated with the face recognition and audio speaker recognition operations.

18. The method of claim 17, wherein the mixture parameter is optimized in accordance with a cost function representative of an error rate.

19. The method of claim 17, wherein the mixture parameter is optimized in accordance with a cost function representative of a smoothed error rate.

20. The method of claim 1, wherein at least one of the video signal and the audio signal are compressed signals.

21. The method of claim 1, wherein compressed signals are decompressed prior to processing operations.

22. The method of claim 1, wherein the arbitrary content video source provides MPEG-2 standard signals.

23. The method of claim 1, wherein the video signal includes at least one of visible electromagnetic spectrum images, non-visible electromagnetic spectrum images, and images from other sensing techniques.

24. The method of claim 1, further comprising the step of enrolling a user in accordance with at least one of acoustic and visual information.

25. The method of claim 24, wherein the result of the enrollment operation is a combined biometric representing multiple modalities.

26. A method of verifying a speech utterance, the method comprising the steps of:
   processing a video signal associated with a video source;
   processing an audio signal associated with the video signal; and
   comparing the processed audio signal with the processed video signal to determine a level of correlation between the signals.

27. The method of claim 26, wherein the video signal processing operation further comprises the step of extracting visual feature vectors from the video signal.

28. The method of claim 27, wherein the video signal processing operation further comprises the step of associating visemes with the extracted feature vectors.

29. The method of claim 28, wherein the audio signal processing operation further comprises the step of extracting acoustic feature vectors and using the extracted features to generate a decoded script representative of the audio signal.

30. The method of claim 29, wherein the decoded script is aligned with the visemes.

31. The method of claim 30, wherein a likelihood of the alignment is computed and used to make the verification determination.

32. A method of verifying a speech utterance, the method comprising the steps of:
   processing a video signal associated with a video source; and
   comparing the processed video signal with a script representing an audio signal associated with the video signal to determine a level of correlation between the signals.

33. Apparatus for performing speaker recognition, the apparatus comprising:
   at least one processor operable to: process a video signal associated with an arbitrary content video source, (ii) process an audio signal associated with the video signal, and (iii) make at least one of an identification and verification decision based on the processed audio signal and the processed video signal.

34. The apparatus of claim 33, wherein the video signal processing operation comprises the step of detecting whether the video signal associated with the arbitrary content video source contains one or more faces.

35. The apparatus of claim 34, wherein the video signal processing operation further comprises the step of detecting one or more facial features on one or more detected faces.

36. The apparatus of claim 35, wherein the video signal processing operation further comprises the step of recognizing one or more faces from the detecting faces using the detected facial features.

37. The apparatus of claim 35, wherein at least one of face and facial feature detection employ a distance from face space (DFFS) measure.

38. The apparatus of claim 35, wherein at least one of face and facial feature detection employ Fisher linear discriminant (FLD) analysis.

39. The apparatus of claim 38, wherein the video signal processing operation further comprises the step of performing a confidence estimation procedure on results of the face recognition operation.

40. The apparatus of claim 38, wherein the audio signal processing operation comprises the step of recognizing a speaker associated with the audio signal.

41. The apparatus of claim 40, wherein the audio signal processing operation further comprises the step of performing a confidence estimation procedure on results of the audio speaker recognition operation.

42. The apparatus of claim 40, wherein respective results of the face recognition and audio speaker recognition operations are used to make at least one of the identification decision and the verification decision.

43. The apparatus of claim 42, wherein the results are combined such that one set of top N respective scores are generated for the face recognition and audio speaker recognition operations and used to make the decision.

44. The apparatus of claim 42, wherein the results of one of the recognition operations are used to modify the results of the other of the recognition operations.

45. The apparatus of claim 44, wherein the decision is based on the modified results.

46. The apparatus of claim 42, wherein the results include the top N respective scores generated during the face recognition and audio speaker recognition operations.

47. The apparatus of claim 46, wherein the top N respective scores are combined using a mixture parameter.

48. The apparatus of claim 47, wherein the mixture parameter is selected within a range which maximizes the highest and the second highest scores.

49. The apparatus of claim 47, wherein the mixture parameter is selected according to a reliability measure associated with the face recognition and audio speaker recognition operations.

50. The apparatus of claim 49, wherein the mixture parameter is optimized in accordance with a cost function representative of a smoothed error rate.

51. The apparatus of claim 49, wherein the mixture parameter is optimized in accordance with a cost function representative of an error rate.

52. The apparatus of claim 33, wherein at least one of the video signal and the audio signal are compressed signals.

53. The apparatus of claim 33, wherein compressed signals are decompressed prior to processing operations.

54. The apparatus of claim 33, wherein the arbitrary content video source provides MPEG-2 standard signals.

55. The apparatus of claim 33, wherein the video signal includes at least one of visible electromagnetic spectrum images, non-visible electromagnetic spectrum images, and images from other sensing techniques.

56. The apparatus of claim 33, wherein the processor is further operable to enroll a user in accordance with at least one of acoustic and visual information.

57. The apparatus of claim 56, wherein the result of the enrollment operation is a combined biometric representing multiple modalities.

58. Apparatus for verifying a speech utterance, the apparatus comprising:
at least one processor operable to: (i) process a video signal associated with a video source, (ii) process an audio signal associated with the video signal, and (iii) compare the processed audio signal with the processed video signal to determine a level of correlation between the signals.

59. Apparatus for verifying a speech utterance, the apparatus comprising:
at least one processor operable to: (i) process a video signal associated with a video source, and (ii) compare the processed video signal with a script representing an audio signal associated with the video signal to determine a level of correlation between the signals.

60. A method of performing speaker recognition, the method comprising the steps of:
processing an image signal associated with an arbitrary content image source;
processing an audio signal associated with the image signal; and
making at least one of an identification and verification decision based on the processed audio signal and the processed image signal.

61. Apparatus for performing speaker recognition, the apparatus comprising:
at least one processor operable to: (i) process an image signal associated with an arbitrary content image source, (ii) process an audio signal associated with the image signal, and (iii) make at least one of an identification and verification decision based on the processed audio signal and the processed image signal.

* * * * *